United States Patent [19]

Boone

[11] 4,054,950
[45] Oct. 18, 1977

[54] APPARATUS FOR DETECTING A PREAMBLE IN A BI-PHASE DATA RECOVERY SYSTEM

[75] Inventor: James G. Boone, Escondido, Calif.

[73] Assignee: NCR Corporation, Dayton, Ohio

[21] Appl. No.: 681,674

[22] Filed: Apr. 29, 1976

[51] Int. Cl.² .................. G06F 1/04; H03K 5/18
[52] U.S. Cl. .................. 364/900; 307/220 R; 307/231; 307/269
[58] Field of Search .................. 340/172.5; 307/208, 307/220 R, 231, 232, 269; 328/72, 108, 109, 110, 119, 120, 139, 179; 235/92 FQ, 92 TF, 92 PE; 364/900

[56] References Cited
U.S. PATENT DOCUMENTS

| | | | |
|---|---|---|---|
| 3,046,526 | 7/1962 | Scantlin | 307/220 R X |
| 3,399,351 | 8/1968 | Reszka | 328/119 |
| 3,428,904 | 2/1969 | Aziz | 328/110 |
| 3,453,551 | 7/1969 | Haberle | 328/119 |
| 3,537,013 | 10/1970 | Feldman | 307/269 X |
| 3,550,017 | 12/1970 | Whalen | 328/110 |
| 3,818,358 | 6/1974 | Russell | 328/119 X |
| 3,894,246 | 7/1975 | Torgrim | 307/208 |
| 3,922,613 | 11/1975 | Allen et al. | 328/119 X |
| 3,940,764 | 2/1976 | Beeswing | 328/119 X |
| 3,990,049 | 11/1976 | Wirth | 340/172.5 |

*Primary Examiner*—Melvin B. Chapnick
*Attorney, Agent, or Firm*—J. T. Cavender; James H. Phillips; Edward Dugas

[57] ABSTRACT

In order to detect the eminent reception of a valid bit serial message, a preamble constituting a string of predetermined number of clock pulses only is employed. Prior to detection of the preamble, each clock and data pulse from the raw data stream is applied to the increment input of a resettable counter. Each clock pulse is also used to trigger a monostable multivibrator which issues a pulse approximating three-fourths of a cell period. This pulse is ANDed with the next subsequent data period, and if a data "1" bit is detected, the satisfied condition is used to reset the counter. Thus, the counter can only reach a terminal count if a valid preamble is received. When the counter attains its terminal count, a latch flip-flop is set and a resultant "separation enable" signal issues to activate straightforward logic for separating the incoming clock and data pulses. Setting the latch also disables the preamble detection logic until an "end of data field" code is sensed whereupon the counter and latch are both reset to resume observation of the raw data stream for a preamble.

4 Claims, 4 Drawing Figures

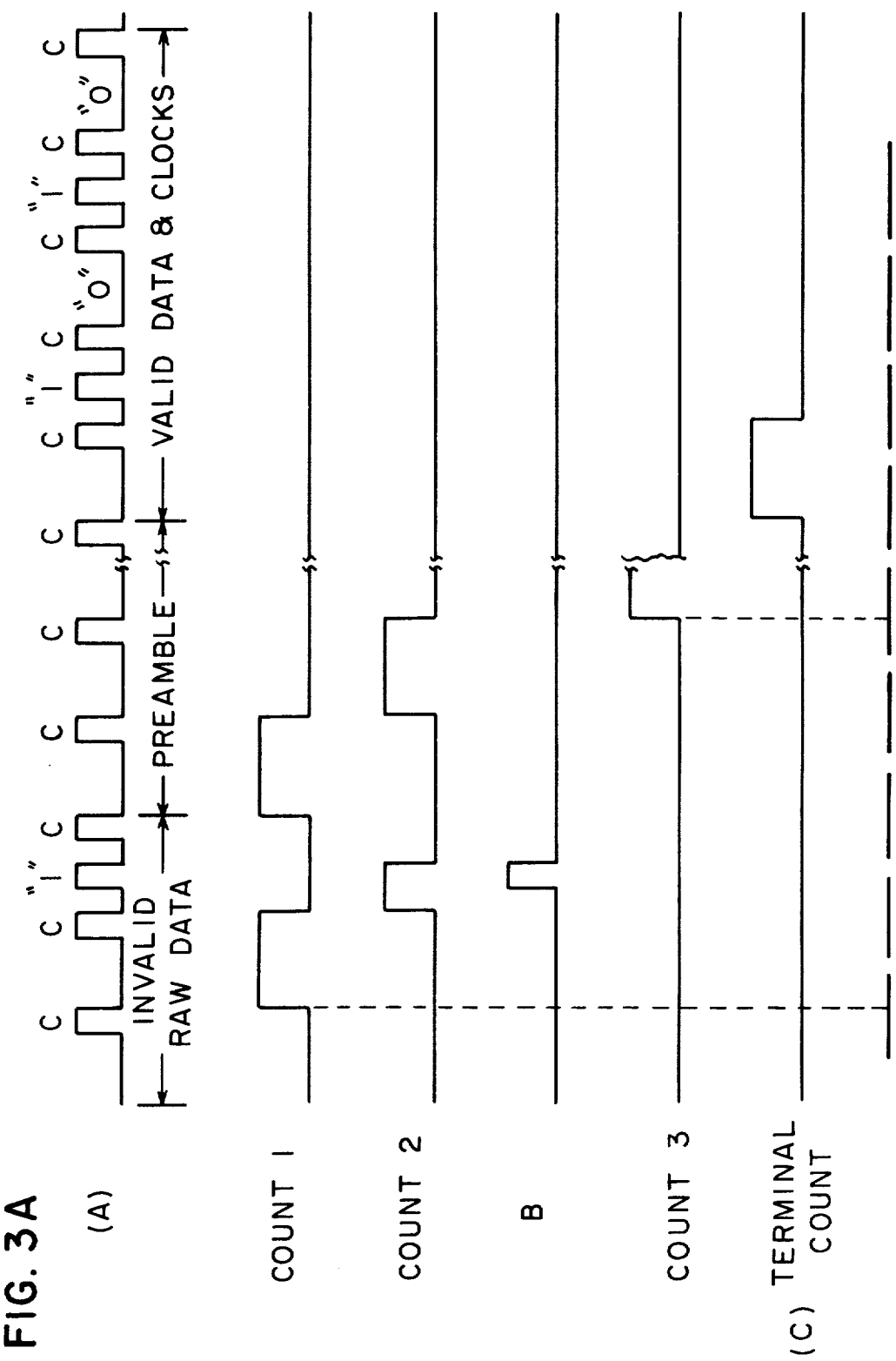

APPARATUS FOR DETECTING A PREAMBLE IN A BI-PHASE DATA RECOVERY SYSTEM

BACKGROUND OF THE INVENTION

This invention relates to the data communication and storage arts and, more particularly, to a method and apparatus for sensing the beginning of a valid digital data message after a period during which invalid data has been received.

Digital data is often transmitted and received in bit serial fashion. Such bit serial communications may take place between terminals and a central data gathering device; during wireless or wire data transmission between, for example, communicating computer systems; and between storage devices and a controller when the storage means is basically serially oriented in nature. Rotating memories, such as magnetic discs and magnetic drums, are examples of serially oriented memory storage devices.

Bit serial transmission of data specifically involves transmission and reception of serial streams of coherent information constituting a message with indeterminate time periods existing between valid messages during which invalid messages may be transmitted and received. For example, memory storage on a rotating disc may include a plurality of messages spaced in "sectors" disposed circumferentially about the disc on various tracks radially spaced from one another. Space must be left between adjacent sectors on a given track in order to separate correspondingly adjacently stored messages. However, the spaces are not physically delineated on the disc surface such that magnetic signals, constituting invalid messages, typically are found in such spaces.

Bit serial data communication, particularly between magnetic discs and disc controllers, is often carried out using a bi-phase (double frequency) code. That is, each cell time normally includes a clock pulse followed by a period in which the presence or absence of a pulse signifies a data "1" or a data "0".

Messages which are transmitted and received serially in bi-phase form must therefore include a message-termination code (which advises the receiving apparatus that a message transmission has been completed) and, more importantly, a code by which the eminent reception of a valid message is called to the attention of receiving apparatus which has previously been rejecting all invalid messages after the reception of the last previous message-terminated indication. Information transmitted and received prior to the transmission of a valid message for the purpose of so alerting the receiving apparatus and for effecting synchronization when necessary is called a "preamble". It is obvious that the preamble detection means must be virtually infallible whereas it is also desirable, for both economic and reliability purposes, to utilize preamble detection apparatus that is simple.

SUMMARY OF THE PRESENT INVENTION

It is therefore a broad object of my invention to provide preamble detection means which is simple and reliable in operation.

It is a further object of my invention to provide such preamble detection means which responds to a bi-phase or double frequency preamble consisting of all clock pulses.

It is yet another object of my invention to provide preamble detection means employing separation logic which responds to a valid preamble by separating data and clock pulses from the raw data stream received and applying the clock pulses to a phase locked loop which issues regenerated clock pulses to transfer the data, in NRZ form, to utilization apparatus in the receiving apparatus.

Briefly, these and other objects of the invention are achieved by analyzing the raw data stream with preamble detection logic circuitry which includes a resettable counter. Each clock or data bit received from the raw data stream is applied to the increment input of the counter. In addition, each clock pulse is applied to a monostable multivibrator which is set to time-out at three-quarters of the period between successive clocks. The output from the monostable multivibrator is utilized to enable one input of an AND-gate which receives, at a second input, the raw data stream. The output from this AND-gate is utilized to reset the counter each time a data "1" bit is detected. However, a predetermined number of successive clock pulses only permits the counter to reach its terminal count whereupon it issues an output pulse to set a bistable latch. The state of the bistable latch is used to indicate that separation logic may be enabled to lock a phase locked loop to the incoming clock and separate the data by clocking it into a D-type flip-flop, this converting the information to NRZ form which is compatible with the data manipulation circuits of the utilization apparatus.

The subject matter of the invention is particularly pointed out and distinctly claimed in the concluding portion of the specification. The invention however, both as to organization and method of operation, may best be understood by reference to the following detailed description taken with reference to the accompanying drawing of which:

BRIEF DESCRIPTION OF THE DRAWINGS

FIGS. 3A and 3B are waveform diagrams representing an exemplary sequence of signals and logic states which can occur during the operation of the apparatus illustrated in FIG. 2.

Figure 3B:
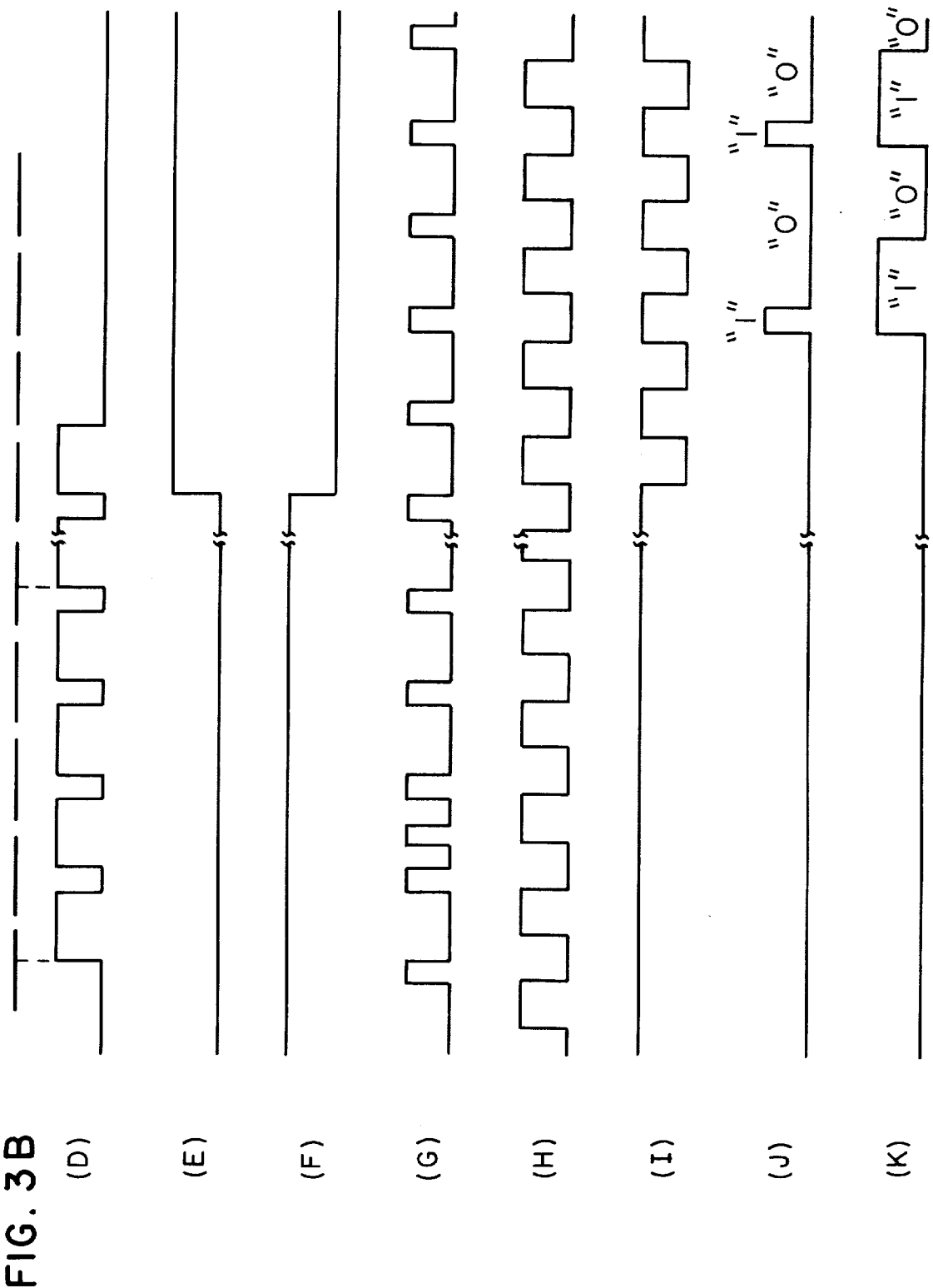

The logic diagram of FIGS. 3A and 3B are presented in slightly simplified form in order that the inventive concepts may be readily understood. For example, instantaneous response times are assumed such that no special logic is shown for overcoming logic once conditions which occur as the speed of operation is increased until the circuits cannot be assumed to respond immediately. The changes and additions required to deal with logic race conditions and other problems associated with high speed operation are known to all skilled in the art and are of no consequence to an understanding of the invention.

DESCRIPTION OF THE PREFERRED EMBODIMENT

Figure 1:
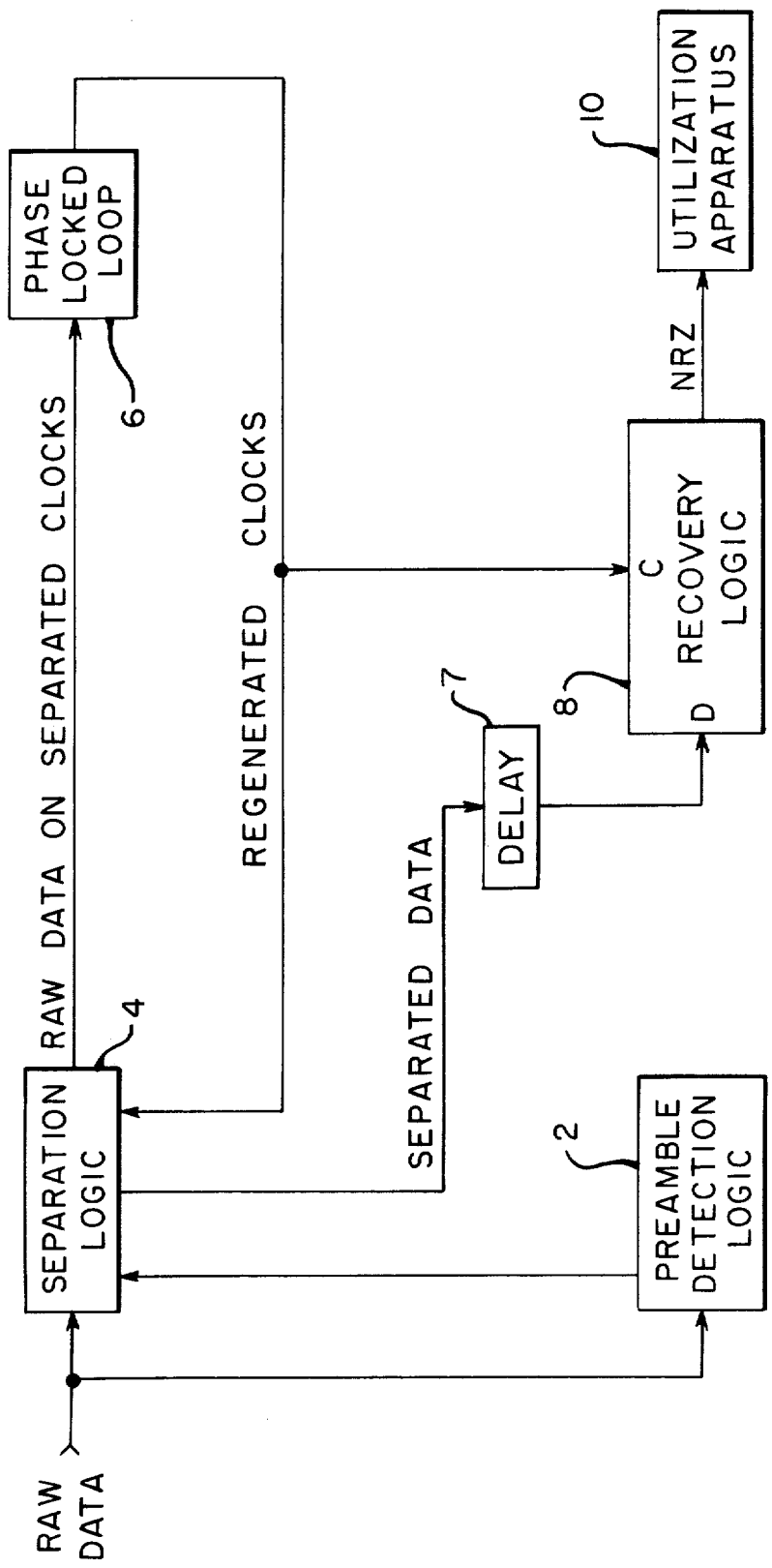
FIG. 1 is a major block diagram of serial data receiving apparatus employing the present invention.

Referring now to FIG. 1, it will be observed that a raw data stream, normally comprising clock and data bits, is applied to preamble detection logic 2 and also to the separation logic block 4. A separation enable signal is coupled from the preamble detection logic 2 to the separation logic 4 such that the separation logic, when enabled by the signal from the preamble detection logic 2, issues separated clocks to maintain a phase locked loop 6 in synchronization whereby the phase locked loop issues regenerated clocks at a rate determined by the clock included with the incoming raw data. The regenerated clocks are applied to the "C" (clock) input of a D-type flip-flop, and separated data from the separation logic 4 is delayed by a one shot 7 and applied to the "D" input of the recovery logic 8 which may be, for example, a D-type flip-flop. A D-type or clocked flip-flop 8 typically has two states representing storage of either a "1" or a "0", a single data input designated "D", a clock input designated "C", and at least one output. The logic state present at the data input "D" appears at the Q output after the occurrence of a particular clocking transition and remains at the Q output until the occurrence of the next like clocking transition. The D-type flip-flop 8 may typically be the first stage of a shift register for receiving serial bit units of information which may thereafter be employed, in series or parallel manipulations, by the utilization apparatus 10.

Figure 2:
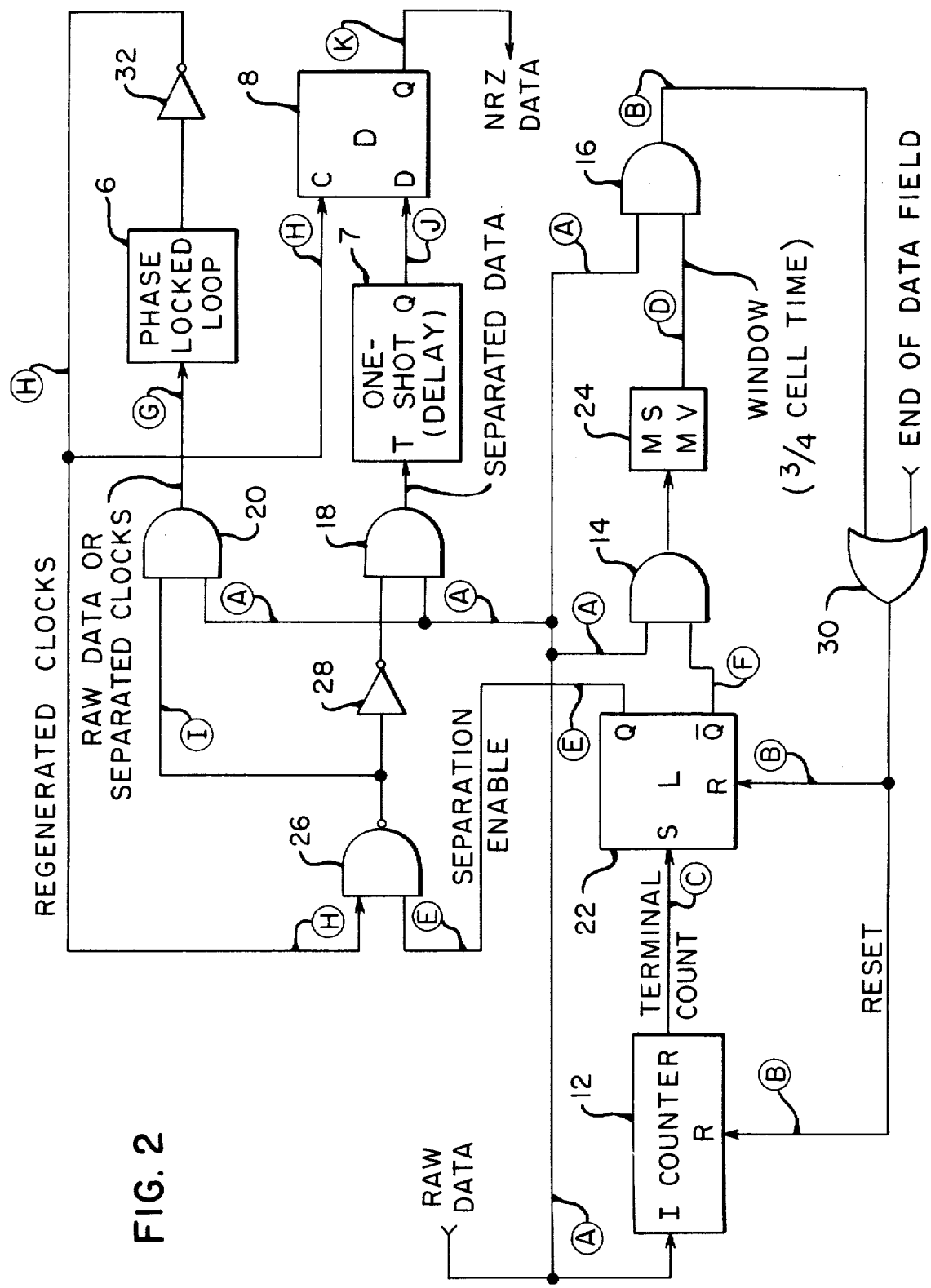
FIG. 2 is a detailed logic block diagram of the apparatus of FIG. 1.

Attention is now directed to FIG. 2 which is a logic diagram of the apparatus depicted in FIG. 1. The raw data, which, as previously noted, constitutes a stream of data and clock bits bi-phase encoded, is applied to the increment input of a counter 12, and also to one input each of first and second AND-gates 14 and 16. In addition, the raw data stream is applied to first inputs of third and fourth AND-gates 18 and 20.

As will be discussed more fully below, the counter 12, unless periodically reset, eventually reaches a predetermined terminal count whereupon it issues a terminal count output signal which is coupled to the set input of a latch flip-flop 22. The $\overline{Q}$ output from the latch flip-flop 22 is connected to a second input of the AND-gate 14 such that it will be understood that the AND-gate 14 can become fully enabled only when the latch flip-flop 22 is in the reset state. Thus, monostable multivibrator 24 can only be triggered when the counter 12 has not attained a terminal count.

The Q output from the latch flip-flop 22 is connected to couple a "separation enable" signal to a first input of a NAND-gate 26. The other input to the NAND-gate 26 receives regenerated clock pulses from the phase locked loop 6 via an inverter 32. As previously noted in the discussion of FIG. 1, the regenerated clock pulses are also applied to the clock input of the D-type flip-flop 8. Those skilled in the art will understand that the regenerated clocks are phase locked too, but are not the same, as the clock signal included within the stream of raw data received into the apparatus. The relationship of the regenerated clocks and the clock pulses in the data stream will be discussed more fully below.

The output from the NAND-gate 26 is applied to a second input of the AND-gate 20 and also to the input of an inverter 28. The output from the inverter 28 is connected to a second input of the AND-gate 18, and it will therefore be understood that the AND-gates 18 and 20 are mutually exclusively enabled according to the state of the NAND-gate 26.

The output from the AND-gate 16 is connected to one input of an OR-gate 30 which drives the reset inputs of both the counter 12 and the latch flip-flop 22. The OR-gate 30 also receives an "end of data field" signal at a second input, and it will be understood that either the two inputs to the OR-gate 30 will serve to reset the counter and the latch flip-flop 22. The origin of the "end of data field" signal is not germane to the present invention although its utilization will be discussed briefly below.

The operation of the apparatus of FIG. 2 is best understood by following an example in which the states of the various logic components at predetermined times are set forth in the diagrams of FIGS. 3A and 3B. It will be observed that, in FIGS. 3A and 3B, most of the waveforms are identified by a letter A–K. Waveforms so identified appear throughout the logic of FIG. 2 at the electrical points identified by corresponding letters adjacent the electrical points.

The raw data stream A illustrated in FIG. 3A presents the last portion of an invalid message (following in time a previously transmitted "end of data field" signal) followed by an all-clock-pulse preamble according to the present invention and, after the preamble, the beginning of a valid data message. The preamble constitutes a predetermined series of clocks only which are sufficient in number to insure that the phase locked loop 6 is synchronized and also sufficient to insure that no chance distribution of magnetic signals could be incorrectly identified as a preamble. For example, 32 consecutive clock pulses are utilized as the preamble in one specific embodiment of the invention.

Assuming that the counter 12 has been reset by previous activity of the logic during the invalid raw data period preceding that shown in FIG. 3A, the first clock pulse, on its trailing edge, advances the counter 12 to a count of 1. This clock pulse also is coupled through the AND-gate 14 since the latch 22 is in the reset state. Thus, the monostable multivibrator 24 is triggered to generate a "window", waveform D, (FIG. 3B) by which a "1" bit invalid data pulse can be detected if it succeeds the particular pulse which has initiated the timing cycle of the multivibrator 24.

The second pulse appearing in the invalid raw data stream is also a clock pulse which, on its trailing edge, advances the counter 12 to a count of two and once again institutes a timing cycle of the monostable multivibrator 24 which generates a second "window" for observing the next succeeding data bit. This time, the data bit is a "1" which occurs while the "window" is still applied to the AND-gate 16. As a result, the data "1" bit fully enables the AND-gate 16 which issues an output pulse through the OR-gate 30 to reset the counter 12. Thus, the counter 12 again contains a count of "0".

The next clock pulse, however, is indeed the first clock pulse of a preamble. It advances the counter to a count of "1" and the counter is thereafter incremented by each clock pulse in the preamble because the AND-gate 16 is never enabled during the preamble period as no data "1" bits are allowed in the preamble. The counter 12 continues to accumulate counts until it reaches the terminal count whereupon a terminal count pulse issues from the counter as shown in waveform C. The terminal count pulse sets the latch flip-flop 22 with its leading edge, and the Q output of the latch 22 issues the "separation enable" signal, waveform E, to bring up one input of the NAND-gate 26. Thus, the regenerated clock signal, waveform H, now appears at the output of NAND-gate 26 as shown by waveform I.

Previously, however, the logic level at the output of the NAND-gate 26 was a "1" to partially enable the AND-gate 20 and to fully disable the AND-gate 18 because of the logic inversion through the inverter 28. It will be seen that, prior to the issuance of the "separation enable" signal, no raw data is allowed to appear at the output of the AND-gate 18. However, during this period, raw data is passed through the AND-gate 20 and applied to the synchronizing input of the phase locked loop 6, as shown by waveform G. During the preamble, only properly timed clock bits are applied to the synchronizing input of the phase locked loop 6 which therefore has adequate opportunity to stabilize itself at the clock frequency and in proper phase which includes a predetermined phase lag inherent to the phase locked loop. Since the output from the phase locked loop is inverted by the inverter 32 to afford the proper logical relationship among the various logic elements, each time the regenerated clock signal, waveform H, is at the logic "0" level, the signal represented by waveform I is at the logic "1" level in order to apply separated clock pulses only to the synchronizing input of the phase locked loop, thereby assuring proper clock frequency and phase during the entire period during which a valid message is transmitted. Similarly, when the regenerated clock signal, waveform H, is at the logic "1" level after the "separation enable" signal, waveform E, has assumed a logic "1" level, the NAND-gate 26 has a logic "0" output which is inverted through the inverter 28 to permit only the separated data from the raw data stream to fully enable the AND-gate 18 if a "1" bit of data is observed and to disable the AND-gate 18 if a "0" bit of data is observed in the raw data stream. As shown in the illustrative raw data bit stream of FIG. 3, waveform A, the message immediately following the preamble commences with a 1010 bit pattern, and this bit stream is delayed by one-shot flip-flop 7 as shown in waveform J. The delayed bit stream is clocked into the D-type flip-flop 8 by the regenerated clock, waveform H, such that the output from the D-type flip-flop 8, in true NRZ form, is as shown by waveform K. Those skilled in the art will understand that the conversion to true NRZ form can be carried out by diverse means once valid separated data and a synchronized clock are simultaneously available.

The counter 12 may continue to count bits in the raw data stream, but each successively recurring terminal count, waveform C, will have no effect upon the operation of the apparatus inasmuch as the latch flip-flop 22 is already in the set state. However, as soon as an "end of data field" code in the valid message is observed, it is desirable to again start the preamble detection logic to observing the raw data stream for a preamble. Thus, an "end of data field" signal, obtained from the utilization apparatus 10 (FIG. 1) which continually looks for the "end of data field" code, is applied, through the OR-gate 30, to the reset inputs of both the counter 12, and the latch flip-flop 22. This causes the latch flip-flop to be reset to disable the "separation enable" signal whereupon the apparatus reassumes the condition of observing the raw data stream for a preamble constituting all clock pulses.

While the principles of the invention have now been made clear in an illustrative embodiment, there will be immediately obvious to those skilled in the art many modifications of structure, arrangement, and components used in the practice of the invention which are particularly adapted for specific environments and operating requirements without departing from those principles.

What is claimed is:

1. Apparatus for detecting an all clock pulse preamble to an encoded digital message having clock pulse and data pulse components, comprising:
    A. a counter having an input adapted to receive said encoded digital message and to increment in response to pulses, a reset input, and an output for issuing an output signal when said counter reaches a predetermined count, said predetermined count corresponding to the number of clock pulses contained in the clock pulse preamble of said encoded digital message;
    B. bistable latch means having a first input coupled to said counter output and responsive to an output signal therefrom to assume a first state indicating receipt of a clock pulse preamble, said bistable latch means having a second input responsive to a signal applied thereto for assuming a second state indicating non-receipt of a clock pulse preamble;
    C. gate means operatively connected to said bistable latch means for providing an output pulse when said bistable latch means is in said second state and a pulse is received from said encoded digital message;
    D. monostable means having an input and an output, said monostable means issuing an output pulse having a predetermined time duration in response to an input pulse applied thereto from said gate means, said predetermined time duration being less than the time period between successive clock pulses; and
    E. reset means coupled to said counter and responsive to the simultaneous occurrence of an output pulse from said monostable means and a data pulse from said encoded digital message for resetting said counter prior to said counter reaching said predetermined count.

2. The apparatus of claim 1 in which said reset means is also coupled to said second input of said bistable latch means to place said bistable latch means in its second state when said counter is reset.

3. The apparatus of claim 2 which further includes:
    A. separation means for controllably separating clock pulses and data pulses from the encoded digital message; and
    B. means responsive to said first state of said bistable latch means for enabling said separation means.

4. The apparatus of claim 1 in which said reset means is an AND gate having an output and an OR gate having one input connected to the output of said AND gate, and another input operative for receiving a termination of encoded digital message signals, the output of said OR gate coupled to said counter.

* * * * *